US008542922B2

(12) United States Patent
Kawano

(10) Patent No.: US 8,542,922 B2
(45) Date of Patent: Sep. 24, 2013

(54) IMAGE PROCESSING APPARATUS, IMAGE PROCESSING METHOD, AND COMPUTER READABLE MEDIUM

(75) Inventor: Hiroyuki Kawano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 6 days.

(21) Appl. No.: 13/232,583

(22) Filed: Sep. 14, 2011

(65) Prior Publication Data

US 2012/0213439 A1 Aug. 23, 2012

(30) Foreign Application Priority Data

Feb. 18, 2011 (JP) ................................ 2011-032968

(51) Int. Cl.
*G06K 9/34* (2006.01)

(52) U.S. Cl.
USPC ........................... 382/173; 382/190; 382/195

(58) Field of Classification Search
USPC ................ 382/173, 190, 195, 218, 220, 280; 348/699; 375/240.16, 240.12; 345/419, 345/422; 600/558, 587, 407, 595
See application file for complete search history.

(56) References Cited

U.S. PATENT DOCUMENTS 7,931,602 B2 * 4/2011 Kayahara et al. ............ 600/558

FOREIGN PATENT DOCUMENTS

JP 2004-200746 A 7/2004
JP 2004-213298 A 7/2004

* cited by examiner

*Primary Examiner* — Anh Do
(74) *Attorney, Agent, or Firm* — Sughrue Mion, PLLC

(57) ABSTRACT

An image processing apparatus includes a segmenting unit, a representative-point setting unit, a vector calculating unit, and a screen-ruling-and-angle extracting unit. The segmenting unit segments an image into regions each having connected pixels. The representative-point setting unit sets a representative point representing each of the regions segmented by the segmenting unit. The vector calculating unit calculates vectors, each constituted of two representative points, on the basis of the representative points set by the representative-point setting unit. The screen-ruling-and-angle extracting unit extracts screen ruling and a screen angle used in the image on the basis of distribution of the vectors calculated by the vector calculating unit.

8 Claims, 9 Drawing Sheets

1140
1100
1145

1100
1130

1100
1120

1100
1110

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-032968 filed Feb. 18, 2011.

BACKGROUND

Technical Field

The present invention relates to image processing apparatuses, image processing methods, and computer readable media.

SUMMARY

According to an aspect of the invention, there is provided an image processing apparatus including a segmenting unit, a representative-point setting unit, a vector calculating unit, and a screen-ruling-and-angle extracting unit. The segmenting unit segments an image into regions each having connected pixels. The representative-point setting unit sets a representative point representing each of the regions segmented by the segmenting unit. The vector calculating unit calculates vectors, each constituted of two representative points, on the basis of the representative points set by the representative-point setting unit. The screen-ruling-and-angle extracting unit extracts screen ruling and a screen angle used in the image on the basis of distribution of the vectors calculated by the vector calculating unit.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the drawings.

Figure 1:
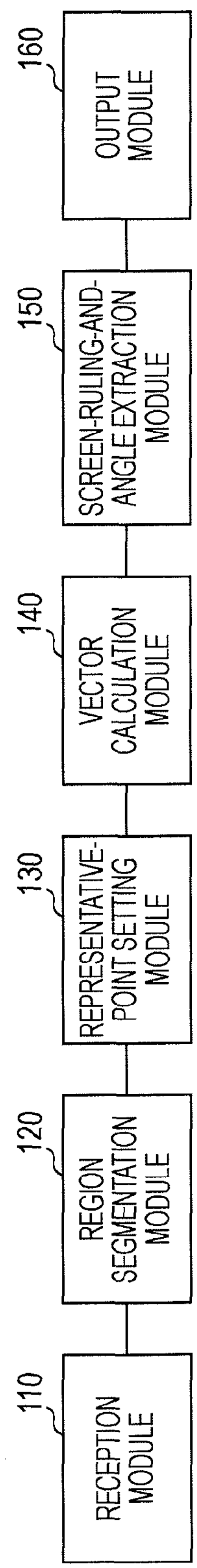
FIG. 1 schematically illustrates a modular configuration in a configuration example according to an exemplary embodiment.

FIG. 1 schematically illustrates a modular configuration in a configuration example according to this exemplary embodiment.

The term "module" generally refers to a logically separable component, such as software (computer program) or hardware. Therefore, each module in this exemplary embodiment not only refers to a module in a computer program, but also to a module in a hardware configuration.

Accordingly, this exemplary embodiment is directed to a description of a computer program for causing a computer to function as each module (i.e., a program for causing the computer to execute each procedure, a program for causing the computer to function as each unit, and a program for causing the computer to achieve each function, as well as to a system and a method. Although the expressions "store data", "make a device store data" and expressions equivalent to these expressions are used for the sake of convenience, these expressions have a meaning of making a storage device store data or performing control to make the storage device store data if the exemplary embodiment corresponds to a computer program. As an alternative to giving each module a single function, each module may be constituted of a single program or multiple modules may be constituted of a single program in actual implementation, or each module may be constituted of multiple programs. Furthermore, multiple modules may be executed by a single computer, or a single module may be executed by multiple computers in a dispersed or parallel environment. As a further alternative, a single module may include another module. The term "connection" used hereinafter refers not only to a physical connection, but also to a logical connection (exchanging of data, sending of a command, or a reference relationship between data). The term "predetermined" refers to a state in which certain information is set before intended processing is to be performed, and includes not only a time point prior to commencement of processing according to this exemplary embodiment, but also a time point prior to the intended processing even when the processing according to this exemplary embodiment has already commenced, depending on the condition or the state at that time or depending on the condition or the state until that time.

The terms "system" and "apparatus" include a case where multiple computers, hardware units, or apparatuses are connected to each other via a communication unit, such as a network (including one-to-one communication connections), and also include a case where a single computer, a single hardware unit, or a single apparatus is used. These terms "system" and "apparatus" are used as terms with an equivalent meaning. It is needless to say that the term "system" does not include the meaning of a social mechanism (social system), which is kind of a man-made agreement or arrangement.

In a case where processing is to be performed by each module or multiple kinds of processing are to be performed within a module, target information is read from the storage device for each processing, and the processed result is written into the storage device upon completion of the processing. Therefore, descriptions regarding the reading of information from the storage device before the processing and writing of information into the storage device after the processing are sometimes omitted. Examples of the storage device in this case may include a hard disk, a random access memory (RAM), an external storage medium, a storage device via a communication line, and a register within a central processing unit (CPU).

An image processing apparatus according to this exemplary embodiment is configured to extract screen ruling and a screen angle used in an image, and includes a reception module 110, a region segmentation module 120, a representative-point setting module 130, a vector calculation module 140, a screen-ruling-and-angle extraction module 150, and an output module 160, as shown in FIG. 1.

The reception module 110 is connected to the region segmentation module 120. The reception module 110 receives a target image and sends the image to the region segmentation module 120. The expression "receive an image" includes, for example, reading an image with a scanner or a camera, receiving an image from an external device using a facsimile device or the like via a communication line, and reading a stored image from a hard disk device (which may be, for example, a built-in hard disk device in a computer or a hard disk device connected via a network). The image may be a binary image (i.e., an image including a so-called halftone region) having undergone screen processing. The binary image may be a color image constituted of multiple binary images. If the image is a multi-value image, the image may be converted to a binary image. The image to be received may be a single image or may include multiple images. The content of the image may be a business document or a pamphlet used for advertisement. The resolution of the image is not limited, and may be, for example, 2400 dpi.

An example of a target screen is a dot-clustered dither screen. If the target screen is a dot-dispersed dither screen, an error-diffused screen, a frequency modulation (FM) screen, or a line screen, the screen-ruling-and-angle extraction module 150 may determine that the target screen is not a dot-clustered dither screen and output a notification of the determination result.

The region segmentation module 120 is connected to the reception module 110 and the representative-point setting module 130. The region segmentation module 120 receives the target image from the reception module 110 and segments the image into regions each having connected pixels. The term "connected pixels" refers to a state where a certain pixel has a pixel of the same color located adjacent thereto, and the term "adjacent pixel" includes a pixel located adjacent to the certain pixel in a diagonal direction. The following description is directed to an example in which black pixels are used. The term "segment" used here includes extraction, in which so-called labeling is performed.

The representative-point setting module 130 is connected to the region segmentation module 120 and the vector calculation module 140. The representative-point setting module 130 sets a representative point that represents each of the regions segmented by the region segmentation module 120. Each representative point may be a point that represents the corresponding region and may be, for example, a central point of a circumscribed rectangle of the region, one of four corner points (i.e., the upper left point, the upper right point, the lower left point, and the lower right point) of the circumscribed rectangle of the region, or a point corresponding to the center of gravity of the region. The following description is directed to an example in which the representative point is the central point of the circumscribed rectangle of the region.

The vector calculation module 140 is connected to the representative-point setting module 130 and the screen-ruling-and-angle extraction module 150. The vector calculation module 140 calculates vectors, each constituted of two representative points, on the basis of the representative points set by the representative-point setting module 130.

Furthermore, the vector calculation module 140 may select a reference representative point from the representative points set by the representative-point setting module 130 as a first representative point and a representative point located between a first predetermined distance and a second predetermined distance from the reference representative point as a second representative point, and calculate a vector constituted of the first representative point and the second representative point. Alternatively, the vector calculation module 140 may select a representative point, as the second representative point, located between the first distance and the second distance within adjacent rectangular regions having the first representative point located at a corner thereof. The term "adjacent rectangular regions" includes four kinds of combinations, namely, a combination of an upper left rectangular region and an upper right rectangular region relative to the first representative point, a combination of an upper right rectangular region and a lower right rectangular region relative to the first representative point, a combination of a lower right rectangular region and a lower left rectangular region relative to the first representative point, and a combination of a lower left rectangular region and an upper left rectangular region relative to the first representative point.

The screen-ruling-and-angle extraction module 150 is connected to the vector calculation module 140 and the output module 160. The screen-ruling-and-angle extraction module 150 extracts screen ruling and a screen angle used in the image on the basis of distribution of the vectors calculated by the vector calculation module 140.

Furthermore, if a difference between the extracted screen ruling or angle and predetermined ruling or angle corresponds to a predetermined relationship, the screen-ruling-and-angle extraction module 150 may extract the extracted screen ruling or angle as the predetermined ruling or angle.

The predetermined ruling or angle is a value stored in a storage device and refers to generally-used screen ruling or angle. Examples of the ruling include 100 lines per inch (LPI), 150 LPI, and 200 LPI, and examples of the angle include 0°, 45°, and 90°. Moreover, the predetermined ruling or angle may be provided as multiple values.

The term "predetermined relationship" refers to when the difference is lower than or equal to a predetermined threshold value.

Examples of the relationship between the extracted screen ruling or angle and the predetermined ruling or angle include a relationship between the extracted screen ruling and the predetermined ruling, a relationship between the extract screen angle and the predetermined angle, and a relationship between the extracted screen ruling and the predetermined ruling and between the extract screen angle and the predetermined angle.

The output module 160 is connected to the screen-ruling-and-angle extraction module 150. The output module 160 outputs the screen ruling and the screen angle extracted by the screen-ruling-and-angle extraction module 150. The term "output" includes, for example, writing the extracted screen ruling and angle in an image storage device, such as an image database, in correspondence with the image (for example, as an attribute of the image), storing the extracted screen ruling and angle in a storage medium, such as a memory card, and sending the extracted screen ruling and angle to another information processing apparatus. This information processing apparatus having received the extracted screen ruling and angle, for example, transforms the binary image received by the reception module 110 into a multi-value image and performs processing for separating a text area and an area having undergone screen processing (e.g., photographic area) from each other.

Figure 2:
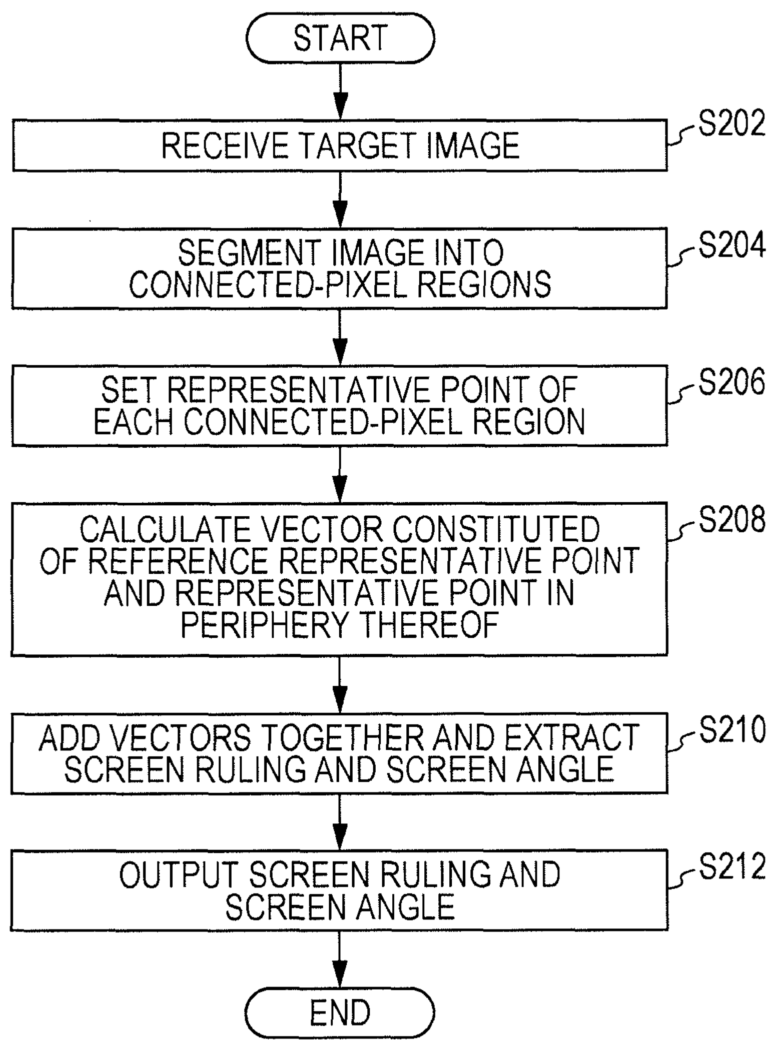
FIG. 2 is a flowchart illustrating an example of processing performed in the exemplary embodiment.

FIG. 2 is a flowchart illustrating an example of processing performed in this exemplary embodiment.

In step S202, the reception module 110 receives a target image.

In step S204, the region segmentation module 120 segments the image into connected-pixel regions. This connected-pixel-region segmentation process will be described in detail with reference to FIGS. 3 to 4B.

Figure 3:
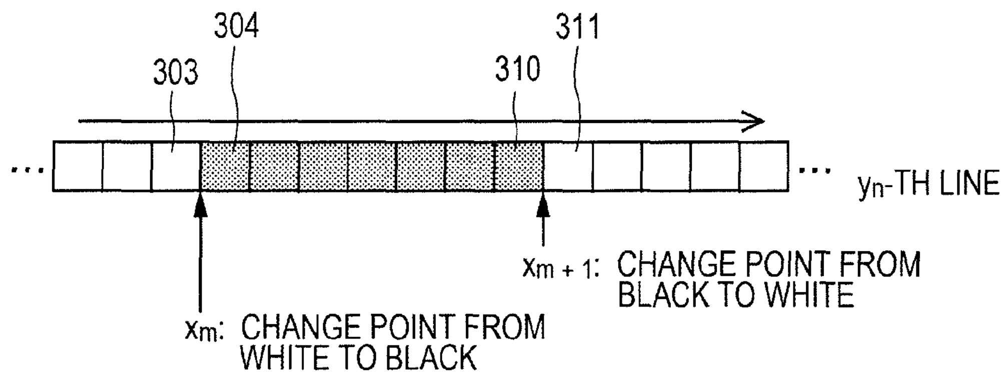
FIG. 3 illustrates an example of processing for extracting change points.

FIG. 3 illustrates an example of processing for extracting change points. The image has lines of pixels (in a scanning direction) and includes a mixture of white pixels and black pixels. Change points of pixels are extracted for each line. In the example shown in FIG. 3, a change point exists between a white pixel 303 and a black pixel 304, and another change point exists between a black pixel 310 and a white pixel 311. These change points are extracted. For example, starting-point coordinates ($x_m$, $y_n$) of a change point, a width ($x_{m+1}-x_m$), and a height (1) are extracted as a region.

Figure 4A:
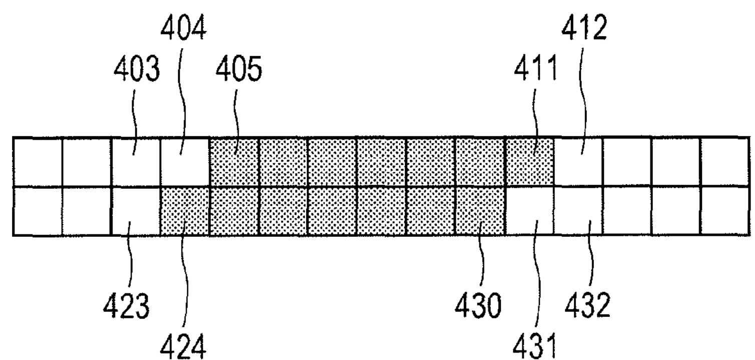
FIGS. 4A and 4B illustrate an example of processing for extracting a connected-pixel region.
Figure 4B:
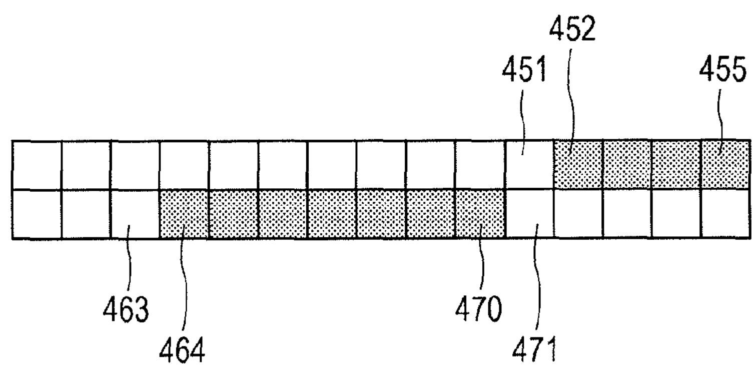

FIGS. 4A and 4B illustrate an example of processing for extracting a connected-pixel region. FIG. 4A shows a case where regions are to be combined with each other. A region extending from a pixel 405 to a pixel 411 in a first line and a region extending from a pixel 424 to a pixel 430 in a second line are connected with each other. In other words, the pixels in the regions within the individual lines are connected. A pixel array extending from the pixel 405 to a pixel located to the left of the pixel 411 in the first line is overlapped and connected in the vertical direction with a pixel array extending from a pixel located to the right of the pixel 424 to the pixel 430 in the second line. Therefore, the two regions are to be combined with each other. For example, a rectangle surrounding the two regions is generated. Specifically, a leftmost x coordinate within the previously generated regions and the regions of the current lines is set as a starting-point coordinate, a difference between the starting-point coordinate and a rightmost x coordinate within the previously generated regions and the regions of the current lines is set as the width, and the height is increased by one. In the example in FIG. 4A, the starting-point coordinate is set between the pixel 423 and the pixel 424, the width is substantially set equal to the distance between the pixel 424 and the pixel 411, and the height is substantially set to be 2.

FIG. 4B shows a case where a new region is to be generated. A region extending from a pixel 452 to a pixel 455 in a first line is not connected with a region extending from a pixel 464 to a pixel 470 in a second line. In other words, the pixels in the first line and the pixels in the second line are not connected at four points or eight points. If the regions are not connected, a new region is generated. In the example in FIG. 4B, a new region with starting-point coordinates (x coordinate between pixel 463 and pixel 464, y coordinate of second line) of a change point, a width (difference between pixel 464 and pixel 470), and a height (1) is generated.

Furthermore, if the lowermost line of the region is in front of the current line by two lines or more, the renewal may be terminated. In other words, the region may be confirmed.

Moreover, a region that is larger than or equal to a predetermined size may be not extracted as a target region. An example of the predetermined size is a maximum block size defined based on minimum ruling (specifically, 24×24 assuming that the ruling is 100 LPI in 2400 dpi).

In step S206, the representative-point setting module 130 sets a representative point of each connected-pixel region generated in step S204. Because a representative point of a region corresponds to the center of the region, the representative point has the following coordinates (x coordinate of starting point+width/2, y coordinate of starting point+height/2).

Figure 5B:
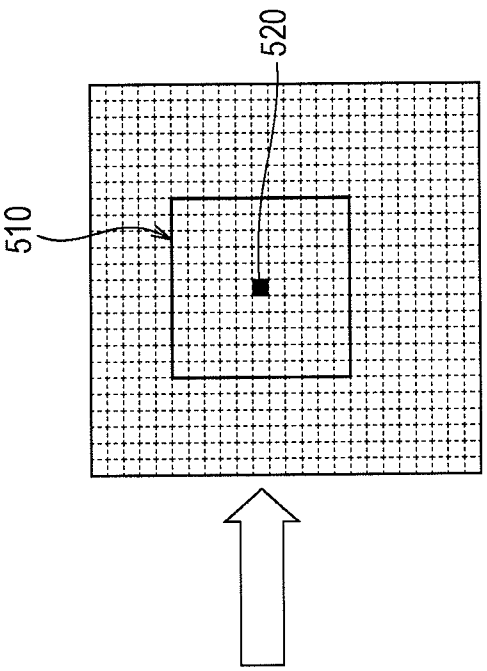
FIGS. 5A and 5B illustrate an example of processing for setting a representative point.
Figure 5A:
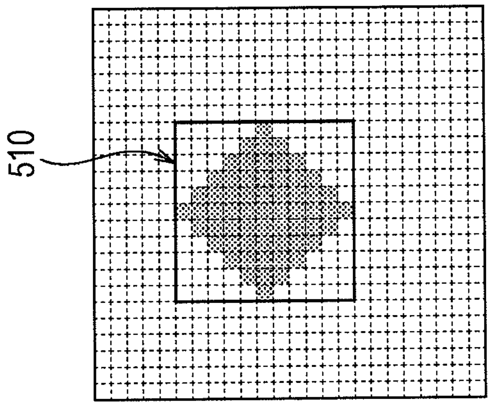

FIGS. 5A and 5B illustrate an example of processing for setting a representative point. The example in FIG. 5A illustrates a rectangular region 510 that surrounds the black pixels extracted in step S204. FIG. 5B illustrates a representative point 520 corresponding to the center of the rectangular region 510.

In step S208, the vector calculation module 140 calculates a vector constituted of the reference representative point and a representative point located in the periphery thereof. In order to calculate a vector, two representative points are extracted.

Figure 6:
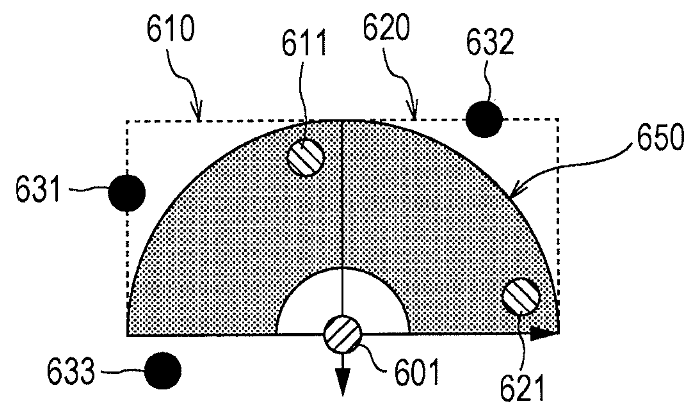
FIG. 6 illustrates an example of processing for extracting representative points.

FIG. 6 illustrates an example of processing for extracting the representative points. When a certain representative point is set as an origin, a representative point closest thereto is extracted from each of an upper left rectangular region 610 and an upper right rectangular region 620. In the example in FIG. 6, a reference representative point 601 is set as an origin, a representative point 611 closest thereto in the upper left direction is extracted so as to extract a vector constituted of the reference representative point 601 and the representative point 611. Then, with the reference representative point 601 as an origin, a representative point 621 closest thereto in the upper right direction is extracted so as to extract a vector constituted of the reference representative point 601 and the representative point 621. Therefore, representative points 631, 632, and 633 are not extracted. The expression "a representative point closest to the reference representative point 601" refers to a representative point closest to the reference representative point 601 within a semicircular donut-shaped search range 650. Because a region close to the reference representative point 601 (i.e., a white-colored region at the center of the search range 650 and surrounding the reference representative point 601) has a high possibility of being noise, a representative point in this region is not to be extracted. The search range 650 has a predetermined width, which is, for example, in a range defined by corresponding ruling. More specifically, if the ruling is between 100 LPI and 200 LPI, the width substantially ranges between 12 pixels and 24 pixels. A semicircular range with a radius equivalent to 12 pixels from the reference representative point 601 is outside the target range.

Although the upper left direction and the upper right direction are described above as an example, a combination of the upper right direction and the lower right direction, a combination of the lower right direction and the lower left direction, or a combination of the lower left direction and the upper left direction is also permissible.

Figure 7:
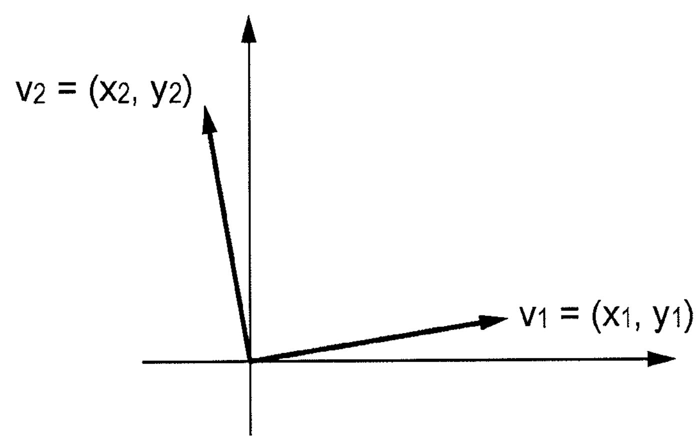
FIG. 7 illustrates an example of processing for calculating vectors.

FIG. 7 illustrates an example of processing for calculating vectors. The extracted vectors in the example in FIG. 6 are shown. Specifically, a vector $v_1$ defined by the reference representative point 601 and the representative point 621 and a vector $v_2$ defined by the reference representative point 601 and the representative point 611 are shown.

If displacement relative to a predetermined angle (e.g., 0°, 45°, or 90°) is within a predetermined number of pixels (e.g., one pixel), the vectors may be extracted on the basis of predetermined representative points.

Furthermore, the vectors may be calculated on the basis of all of the representative points set as reference representative points (origins), or on the basis of a predetermined number of representative points set as reference representative points (origins), or on the basis of representative points located at predetermined positions (which may be randomly selected positions) set as reference representative points (origins).

In step S210, the screen-ruling-and-angle extraction module 150 adds the vectors together so as to extract screen ruling and a screen angle. This is performed by plotting the end points (i.e., representative points that are not reference representative points (origins)) of the vectors calculated in step S208. Specifically, the positions of the end points in the coordinate system shown in FIG. 7 are counted.

Figure 8:
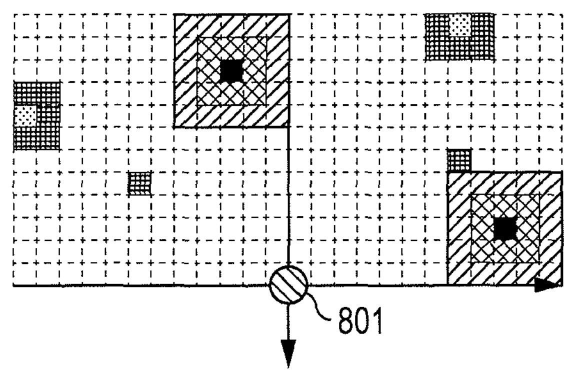
FIG. 8 illustrates a distribution example of the vectors.

FIG. 8 illustrates a distribution example of vectors in a dot-clustered dither screen. In a coordinate system having a reference representative point 801 as an origin, dark-colored positions have a large number of vectors distributed therein. A rectangular region located in the upper right direction relative to the reference representative point 801 has a large number of vectors distributed at the lower right side, and a rectangular region located in the upper left direction relative to the reference representative point 801 has a large number of vectors distributed at the upper right side.

Figure 9:
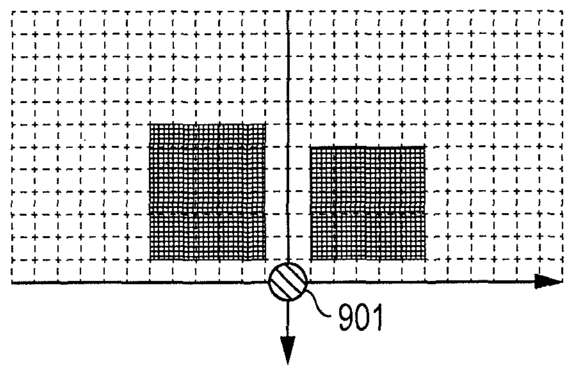
FIG. 9 illustrates another distribution example of the vectors.

FIG. 9 illustrates a distribution example of vectors in a dot-dispersed dither screen, an error-diffused screen, or an FM screen. In a coordinate system having a reference representative point 901 as an origin, dark-colored positions have a large number of vectors distributed therein. This coordinate system does not have positions with a prominently large number of vectors distributed therein, as compared with the example in FIG. 8.

A position corresponding to a peak is extracted from the distribution. Determination of whether or not a position corresponds to a peak is performed by comparing a predetermined threshold value with a difference between a first-ranked value and a second-ranked value or with a proportion of the peak in the overall distribution (for example, by determining whether or not the difference or the proportion is greater than or equal to the threshold value). The determination may alternatively be performed by comparing a signal-to-noise (S/N) ratio of a maximum value in a local region with a predetermined threshold value (for example, by determining whether or not the S/N ratio is greater than or equal to the threshold value) (see Japanese Unexamined Patent Application Publication No. 2005-221276). As a further alternative, the determination may be performed by comparing a Q-value of X (chi-square) distribution with a predetermined threshold value (for example, by determining whether or not the Q-value is greater than or equal to the threshold value) (see document publicly released by JAXA).

Figure 10B:
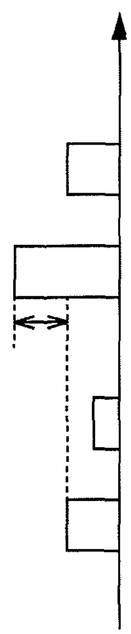
FIGS. 10A and 10B illustrate an example of processing for determining a peak.
Figure 10A:
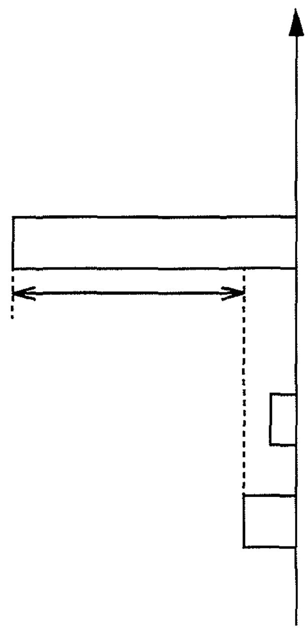

FIGS. 10A and 10B illustrate an example of processing for determining a peak using a first-ranked value and a second-ranked value. In a histogram example shown in each of FIGS. 10A and 10B, the abscissa denotes a coordinate position and the ordinate denotes the number of distributed vectors. The histogram example in FIG. 10A corresponds to the example in FIG. 8. In this example, a position is determined as being a peak due to the difference between the first-ranked value and the second-ranked value being larger than or equal to the threshold value. The histogram example in FIG. 10B corresponds to the example in FIG. 9. In this example, a position cannot be determined as being a peak due to the difference between the first-ranked value and the second-ranked value being smaller than the threshold value. If a peak cannot be extracted, it may be determined that the screen is not a dot-clustered dither screen. The output module 160 may then output the determination result.

Because a dot-dispersed dither screen, an error-diffused screen, and an FM screen have a short distance between central points, have a variable distribution range depending on the density, and also have unstable directivity, a peak cannot be extracted from these screens. Regarding a line screen, a peak cannot be extracted therefrom since such a screen is similar to a dot-dispersed dither screen in being density dependent or since each line in the screen corresponds to a single large area.

Screen ruling and a screen angle are calculated from the position of the peak.

Screen ruling is calculated by using the distance between the origin (i.e., reference representative point) and the peak position, and the resolution. The distance between the origin and the peak position corresponds to the magnitude of the corresponding vector and is equal to the distance between the regions (halftone dots) segmented by the region segmentation module 120. An actual distance (expressed in, for example, inches) is calculated by using this distance and the resolution, and the ruling (i.e., the density of halftone dots per unit length) is calculated on the basis of the reciprocal of the actual distance.

The screen angle corresponds to the vector angle, and an angle formed between a line constituted of the origin and the peak position (e.g., a peak within the rectangle at the upper right side of the origin) and a reference line (e.g., a horizontal line (x axis)) is the screen angle.

In this case, if a difference between the extracted screen ruling or angle and predetermined ruling or angle corresponds to a predetermined relationship, the screen-ruling-and-angle extraction module 150 may extract the extracted screen ruling or angle as the predetermined ruling or angle.

In step S212, the output module 160 outputs the screen ruling and the screen angle. Then, the image processing apparatus receives the screen ruling and the screen angle and performs image processing. Examples of the image processing include transforming the image into a multi-value image and processing for separating a text area and an image area, such as a photographic area, from each other.

FIGS. 11A to 11D each illustrate an example of a target image. The image processing apparatus according to this exemplary embodiment may process the following target areas in an image 1100 received by the reception module 110.

Figures 11A, 11B, 11C, 11D:
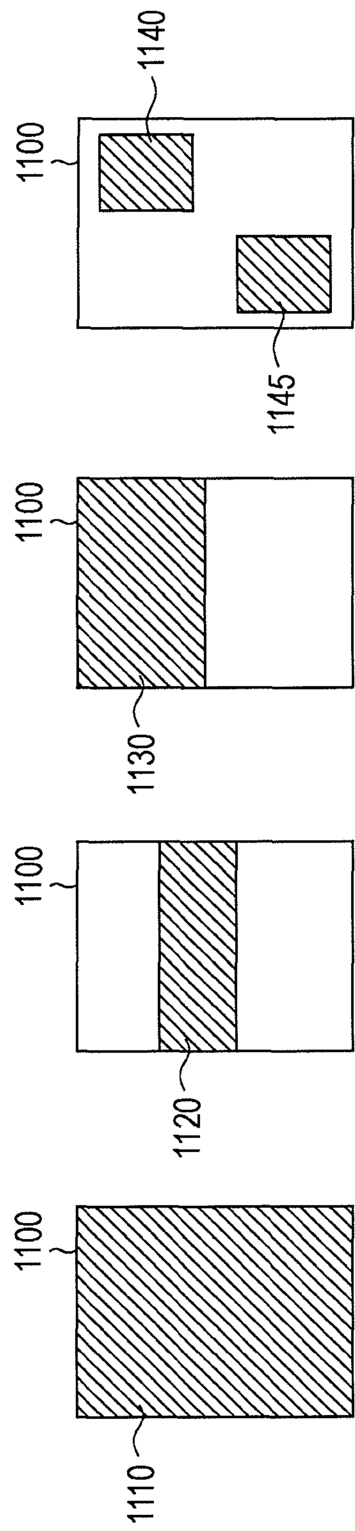
FIGS. 11A to 11D each illustrate an example of a target image.

In the example in FIG. 11A, an entire image area 1110 of the image 1100 is the target area. Although this example ensures accuracy, a large volume of page memory is necessary, as compared with other examples.

In the example in FIG. 11B, a multiple-lines area 1120 in the image 1100 is the target area. The multiple-lines area 1120 may be a predetermined area or may be an area including a halftone region that is obtained by being extracted by image processing. Although this example has lower accuracy than the example in FIG. 11A, the volume of memory may be reduced. This example is suitable for, for example, when speed enhancement by hardware is to be achieved.

In the example in FIG. 11C, a sample-number attained area 1130 of the image 1100 is the target area. The sample-number attained area 1130 is an area with a predetermined number of samples (i.e., the number of vectors or the number of distributed vectors mentioned above) or more. In the sample-number attained area 1130, when the predetermined number of samples is reached, the processing is aborted. Although this example has lower accuracy than the example in FIG. 11A, the processing time may be shortened. This example is suitable for, for example, when speed enhancement by software is to be achieved.

In the example in FIG. 11D, a screen area 1140 and a screen area 1145 of the image 1100 are the target areas. One of the screen area 1140 and the screen area 1145 may be selected by an operator using a mouse, a keyboard, or a touch-screen or by image-processing a halftone region. Furthermore, in this case, screen ruling and a screen angle may be calculated for each selected area. Therefore, this example can be used when there are areas with different kinds of screens within a single image.

Figure 12:
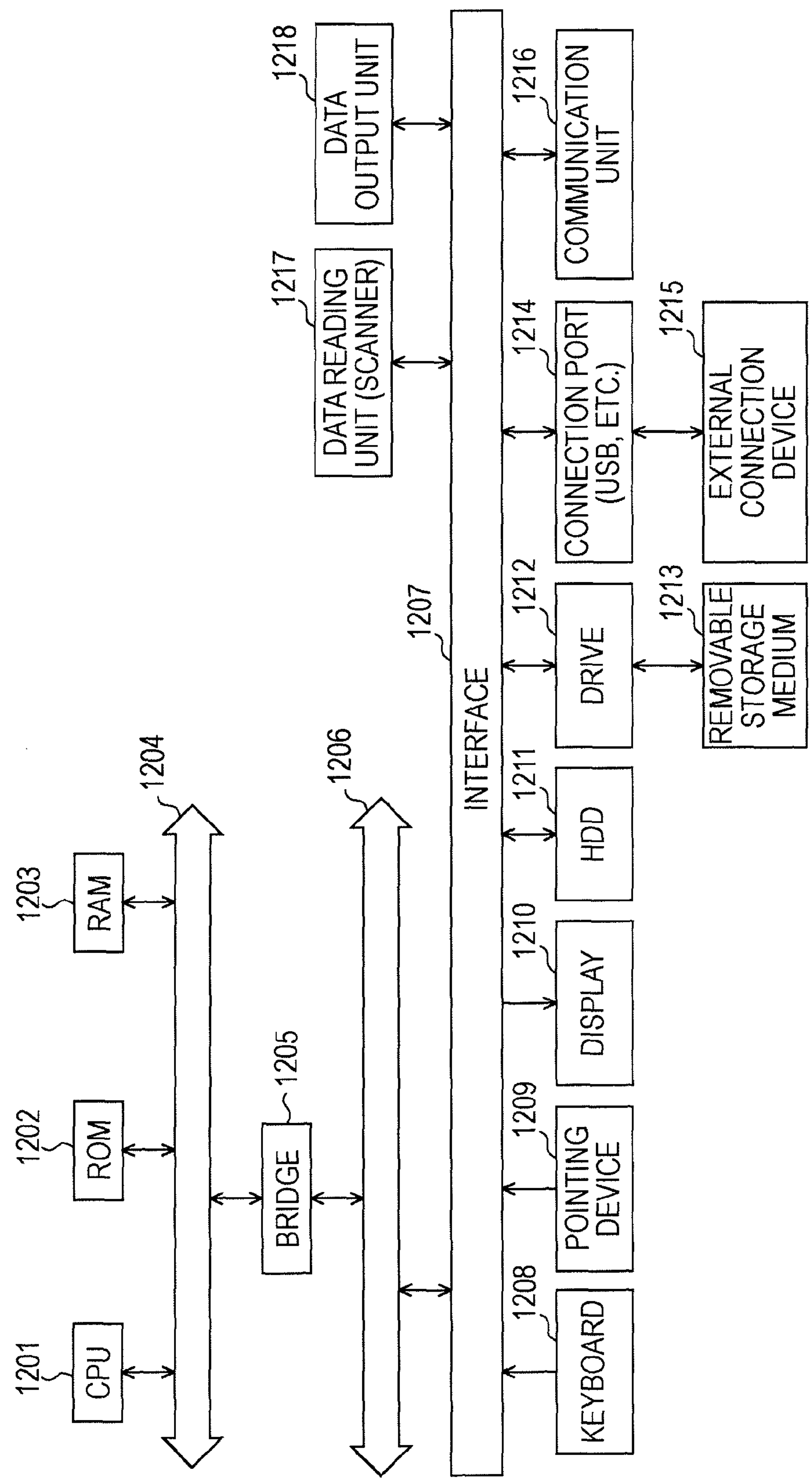
FIG. 12 is a block diagram illustrating an example of a hardware configuration of a computer that achieves the exemplary embodiment.

An example of a hardware configuration in the image processing apparatus according to this exemplary embodiment will now be described with reference to FIG. 12. The hardware configuration shown in FIG. 12 is constituted of, for example, a personal computer (PC) and includes a data reading unit 1217, such as a scanner, and a data output unit 1218, such as a printer.

A central processing unit (CPU) 1201 serves as a controller that executes processing in accordance with a computer program having written therein operation sequences for the various modules described in the aforementioned exemplary embodiment, namely, the region segmentation module 120, the representative-point setting module 130, the vector calculation module 140, and the screen-ruling-and-angle extraction module 150.

A read-only memory (ROM) 1202 stores programs and calculation parameters to be used by the CPU 1201. A random access memory (RAM) 1203 stores programs to be used in the operation of the CPU 1201 and parameters that appropriately change depending on the operation of the CPU 1201. The CPU 1201, the ROM 1202, and the RAM 1203 are connected to each other via a host bus 1204 constituted of a CPU bus.

The host bus 1204 is connected to an external bus 1206, such as a peripheral component interconnect/interface (PCI) bus, via a bridge 1205.

A keyboard 1208 and a pointing device 1209, such as a mouse, are input devices to be operated by the operator. A display 1210 is a liquid-crystal display device or a cathode ray tube (CRT) and displays various kinds of information as text information or image information.

A hard disk drive (HDD) 1211 contains a hard disk and drives the hard disk so as to record or reproduce information or a program to be executed by the CPU 1201. The hard disk stores a received image, extracted regions, vectors, screen ruling, and a screen angle. Furthermore, the hard disk also stores various computer programs, such as various data processing programs.

A drive 1212 reads data or a program stored in a removable storage medium 1213 loaded therein, such as a magnetic disk, an optical disk, a magneto-optical disk, or a semiconductor memory, and supplies the data or the program to the RAM 1203 connected to the drive 1212 via an interface 1207, the external bus 1206, the bridge 1205, and the host bus 1204. Similar to the hard disk, the removable storage medium 1213 can be used as a data storage area.

A connection port 1214 is a port for connecting to an external connection device 1215 and has a USB or IEEE1394 connector. The connection port 1214 is connected to the CPU 1201 and the like via the interface 1207, the external bus 1206, the bridge 1205, and the host bus 1204. A communication unit 1216 is connected to a network and performs data communication with the outside. The data reading unit 1217 is, for example, a scanner and reads a document. The data output unit 1218 is, for example, a printer and outputs document data.

The hardware configuration of the image processing apparatus shown in FIG. 12 is merely one configuration example, and this exemplary embodiment is not limited to the configuration shown in FIG. 12 so long as the modules described in the exemplary embodiment can be executed. For example, one of or some of the modules may be constituted of dedicated hardware (e.g., an application specific integrated circuit (ASIC)), and one of or some of the modules may be disposed in an external system and be connected via a communication line. Moreover, the system shown in FIG. 12 may be constituted of multiple systems that are connected to each other via a communication line and operate in coordination with each other. Furthermore, the hardware configuration may be incorporated into a copier, a facsimile device, a scanner, a printer, or a multifunction apparatus (i.e., an image processing apparatus having at least two functions of a scanner, a printer, a copier, and a facsimile device).

The above-described program may be provided by being stored in a storage medium, or the program may be provided via a communication unit. In that case, for example, the above-described program may be defined as a "computer readable medium that stores a program".

The term "computer readable medium that stores a program" refers to a computer readable storage medium that is used for storing the program for installation of the program, execution of the program, and distribution of the program.

Examples of a storage medium include a digital versatile disc (DVD), a compact disc (CD), a Blu-ray Disc (registered trademark), a magneto-optical disk (MO), a flexible disk (FD), a magnetic tape, a hard disk, a read-only memory (ROM), an electrically erasable programmable read-only memory (EEPROM (registered trademark)), a flash memory, and a random access memory (RAM). Examples of a DVD include a DVD-R, a DVD-RW, and a DVD-RAM, which are standards developed by DVD Forum, and a DVD+R and a DVD+RW, which are standards developed by DVD+RW Alliance. Examples of a CD include a compact disc read-only memory (CD-ROM), a compact disc recordable (CD-R), and a compact disc rewritable (CD-RW).

The aforementioned program or a part thereof may be stored in the storage medium for distribution or storage. Furthermore, the aforementioned program or a part thereof may be transmitted via a transmission medium, such as a wired network, a wireless network, or a combination of these networks, or may be transferred via a carrier wave. Examples of a wired network include a local area network (LAN), a metropolitan area network (MAN), a wide area network (WAN), the Internet, an intranet, and an extranet.

Furthermore, the aforementioned program may be a part of another program, or may be stored in a storage medium together with a different program. Moreover, the aforementioned program may be stored in segments in multiple storage media. The aforementioned program may be stored in any state, such as a compressed state or an encrypted state, so long as the program is recoverable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a segmenting unit that segments an image into regions each having connected pixels;

a representative-point setting unit that sets a representative point representing each of the regions segmented by the segmenting unit;

a vector calculating unit that calculates vectors, each constituted of two representative points, on the basis of the representative points set by the representative-point setting unit; and a screen-ruling-and-angle extracting unit that extracts screen ruling and a screen angle used in the image on the basis of distribution of the vectors calculated by the vector calculating unit.

2. The image processing apparatus according to claim 1, wherein, if a difference between the extracted screen ruling or the extracted angle and predetermined ruling or a predetermined angle corresponds to a predetermined relationship, the screen-ruling-and-angle extracting unit extracts the extracted screen ruling or the extracted angle as the predetermined ruling or the predetermined angle.

3. The image processing apparatus according to claim 1, wherein the vector calculating unit selects a reference representative point from the representative points set by the representative-point setting unit as a first representative point and a representative point located between a first predetermined distance and a second predetermined distance from the reference representative point as a second representative point, and calculates a vector constituted of the first representative point and the second representative point.

4. The image processing apparatus according to claim 2, wherein the vector calculating unit selects a reference representative point from the representative points set by the representative-point setting unit as a first representative point and a representative point located between a first predetermined distance and a second predetermined distance from the reference representative point as a second representative point, and calculates a vector constituted of the first representative point and the second representative point.

5. The image processing apparatus according to claim 3, wherein the vector calculating unit selects a representative point, as the second representative point, located between the first distance and the second distance within adjacent rectangular regions having the first representative point located at a corner thereof.

6. The image processing apparatus according to claim 4, wherein the vector calculating unit selects a representative point, as the second representative point, located between the first distance and the second distance within adjacent rectangular regions having the first representative point located at a corner thereof.

7. A computer readable medium storing a program causing a computer to execute a process for processing an image, the process comprising:

segmenting an image into regions each having connected pixels;

setting a representative point representing each of the segmented regions;

calculating vectors, each constituted of two representative points, on the basis of the set representative points; and extracting screen ruling and a screen angle used in the image on the basis of distribution of the calculated vectors.

8. An image processing method comprising:

segmenting an image into regions each having connected pixels using a segmenting module;

setting a representative point representing each of the segmented regions using a representative-point setting module;

calculating vectors using a vector calculating module, each constituted of two representative points, on the basis of the set representative points; and extracting screen ruling and a screen angle used in the image on the basis of distribution of the calculated vectors using a screen-ruling-and-angle extracting module.

* * * * *